(No Model.)
J. P. MANNY.
HARVESTER.
No. 250,270. Patented Nov. 29, 1881.
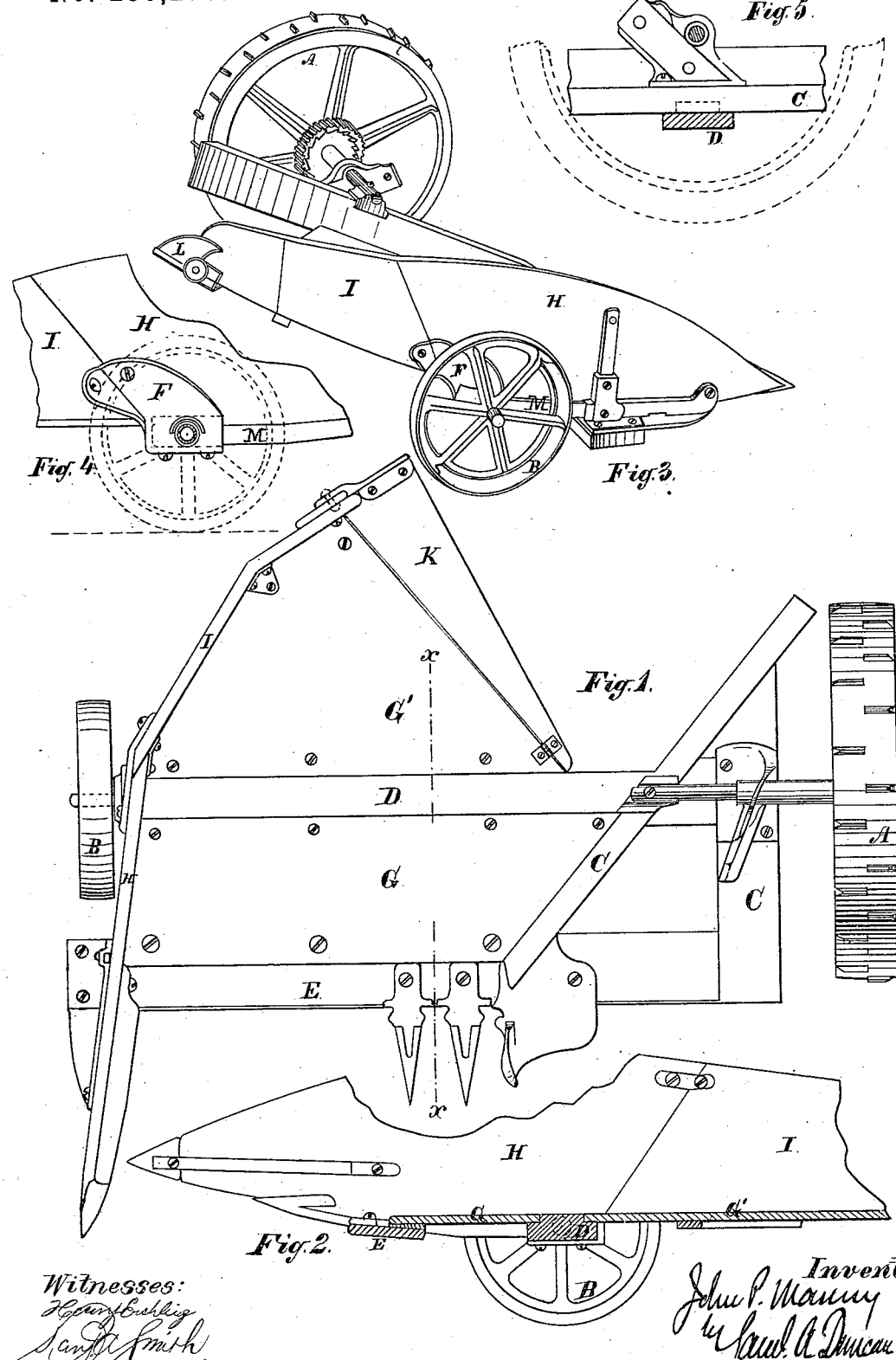
Witnesses:
Henry Bushlig
San'l A. Smith
Inventor:
John P. Manny
by Sam'l A. Duncan Atty

United States Patent Office.

JOHN P. MANNY, OF ROCKFORD, ILLINOIS.

HARVESTER.

SPECIFICATION forming part of Letters Patent No. 250,270, dated November 29, 1881.

Application filed May 24, 1880. (No model.)

*To all whom it may concern:*

Be it known that I, JOHN P. MANNY, of Rockford, in the county of Winnebago and State of Illinois, have invented a new and useful Improvement in Harvesters, of which the following is a specification.

The present invention relates to the platform of the machine and the arrangement of the connected parts; and so far as it has to do with the one-wheeled harvester or machine having one main or driving wheel, it consists in making the platform in parts, and in the arrangement of the parts of the sectional platform relatively to the carrying-beam and to each other, as hereinafter explained; also, in the arrangement of the finger-beam and guards relatively to the platform, and in the mode of supporting and bracing the parts at the grain side of the platform.

The invention is fully illustrated in the accompanying drawings, in which Figure 1 is a plan view of a machine embodying the invention. Fig. 2 is a longitudinal vertical section of the same on the line $x\ x$ of Fig. 1, showing in elevation the parts beyond such section. Fig. 3 is a rear perspective view of the machine. Fig. 4 is an elevation of a part of the grain side of the apparatus, the grain-wheel being shown in dotted lines; Fig. 5, an elevation, on the side next the driving-wheel, of a part of the main frame and of the casting mounted thereon and forming a bearing for the main axle.

In the machine here represented, which is a one-wheeled machine, A is the driving-wheel, and B the grain-wheel.

The main frame C is of triangular form, and projecting laterally therefrom is a stout beam, D, firmly attached to the main frame, and situated substantially in the vertical plane of the axes of the two wheels A and B. This beam constitutes, as it were, the backbone of the machine, and in front of it is placed the cutter-bar or finger-beam E, one end of which is supported by the main frame, and the other end by a brace reaching forward from the casting F at the grain end of the platform. The platform proper is in two sections, one of which, G, bridges over the space between the finger-beam and the main carrying-beam, while the other section, G', is removably attached to the rear edge of the carrying-beam, its outer end also being supported in part from the wing or fence which sweeps around from the grain-wheel. These two sections of the platform are so related to the main beam that the upper surfaces of the three are in the same plane, making practically a continuous surface. By thus making the platform in two sections and rabbeting the sections onto the front and rear edges of the transverse carrying-beam the beam can be raised somewhat higher above the ground than would be practicable if the platform were unbroken and the beam were entirely beneath it. This construction therefore facilitates the passing of obstructions. The position of the carrying-frame on a line between the two wheels, especially when braced by connection with a triangular main frame, is one that confers great strength upon the structure, besides being economical in construction and compact. It is believed also that it is peculiarly adapted to give a good balance to the machine, as it permits the use of the lightest practicable finger-beam. The construction of this platform in two sections, again, will be found specially convenient, as the rear section can be removably attached to the carrying-beam, and so can be readily detached whenever it is required to ship the machine by cars or otherwise.

The mode of attachment may be by screws, or by bolts and nuts, or in any other convenient way.

H is the divider-board upon the grain side of the platform, and I is a wing or fence extending rearward from such divider-board. The rear section, G', of the platform may be bolted to the under side of this wing, and be thus in part sustained.

To the rear of the section G' of the platform there is attached by suitable hinges a leaf, K, capable of being set either at an upward or a downward inclination relatively to the plane of the body of the platform. The inclination of this leaf may be regulated by means of a plate or arm, L, working against the side of the wing I, and provided with any suitable detent for holding it in any desired position. When by tilting the platform the cutters are elevated to cut high, the rear of the platform is correspondingly depressed, and the tendency of the rake will be to drive the head of the gavel down into the stubble and thus disarrange it; but by raising the adjustable leaf K this drooping of the rear of the platform may be compensated for, so that the rake will carry the head of the bundle clear above the stubble and thus effect a good delivery. When, again, the cutters are depressed for cutting low, the rear of the platform will be correspondingly raised. At such times it may be found necessary to drop the adjustable leaf, so as to prevent the gavel from being carried up so high as to be caught by the wind, and thus thrown into confusion.

At the grain end of the platform is a casting, F, which is so constructed as to perform the manifold function of serving as a bearing for the axle of the grain-wheel, of acting as a support for the divider-board H and the wing I, and furnishing a bearing for the brace M, which stays the grain end of the finger-beam. The finger-beam, as is clearly shown in the drawings, is placed below the plane of the upper surface of the platform, the front edge of the platform, as also the guards and shoe, resting on the upper face of the finger-beam. Under this construction the front edge of the platform constitutes an abutment or obstruction against which the butt-ends of the stalks of the grain strike as soon as they are severed by the cutters, and this with the aid of the reel (not shown in the drawings) throws the grain down immediately, and thus lays it more regularly upon the platform than would otherwise be the case.

What is claimed as new is—

1. The grain-platform composed of the transverse carrying-beam D and the two sections G G', arranged on a common plane with the upper surface of such beam, substantially as described.

2. The combination of a permanent carrying-beam, arranged in the line of the driving-wheel and the grain-wheel, and a platform constructed in two parts, the rear one of which is made detachable, substantially as set forth.

3. The combination of a carrying-beam supporting the front edge of the rear part of the divided grain-platform and a rigid overhanging wing or fence supporting the back part of such portion of the platform, substantially as set forth.

4. The casting F, constructed substantially as described, so as to support the grain-wheel, the divider, the wing I, and the brace for the outer end of the finger-beam.

5. In combination with the finger-beam, the shoe, guards, and front edge of the platform, all arranged on the upper surface of the finger-beam, substantially as described.

JOHN P. MANNY.

Witnesses:
FRANK C. KING,
J. GERBER.